United States Patent
Kim et al.

(10) Patent No.: US 8,983,672 B2
(45) Date of Patent: Mar. 17, 2015

(54) DEMAND RESPONSE SYSTEM

(75) Inventors: Hyun Ki Kim, Seoul (KR); Jae Min Lim, Anyang-si (KR); Seong Uk Pyung, Suwon-si (KR); Sun Il Jin, Yongin-si (KR); Hyeng Kyun Kim, Yongin-si (KR); Jae Yu Seo, Suwon-si (KR); Seong Wook Jeong, Gwangju-si (KR); Sung Ho Cho, Gwangju-si (KR); Jung Won Park, Gwangju-si (KR); Jang Beom Yang, Gwangju-si (KR); Chang Ho Son, Hwaseong-si (KR); Young Jin Baek, Changwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 490 days.

(21) Appl. No.: 12/929,873

(22) Filed: Feb. 22, 2011

(65) Prior Publication Data

US 2011/0218680 A1 Sep. 8, 2011

(30) Foreign Application Priority Data

Mar. 2, 2010 (KR) ........................ 10-2010-0018627

(51) Int. Cl.
- *G06F 1/32* (2006.01)
- *G05D 23/19* (2006.01)
- *H02J 3/00* (2006.01)

(52) U.S. Cl.
CPC ........................................ *H02J 3/00* (2013.01)
USPC ............ 700/295; 700/276; 700/300; 700/297

(58) Field of Classification Search
CPC . H02J 3/00; H02J 2003/143; H02J 2003/146; G06F 1/32; Y04S 20/221

USPC .................................................. 700/295, 276
See application file for complete search history.

(56) References Cited

U.S. PATENT DOCUMENTS

| | | | |
|---|---|---|---|
| 5,289,362 A * | 2/1994 | Liebl et al. ....................... | 700/22 |
| 5,430,430 A * | 7/1995 | Gilbert ..................... | 340/870.02 |
| 5,761,083 A * | 6/1998 | Brown et al. .................. | 700/296 |
| 6,181,985 B1 * | 1/2001 | O'Donnell et al. ........... | 700/295 |
| 6,891,478 B2 | 5/2005 | Gardner | |

(Continued)

FOREIGN PATENT DOCUMENTS

| CN | 101645602 | 2/2010 |
|---|---|---|
| EP | 0 456 872 A1 | 11/1991 |

(Continued)

OTHER PUBLICATIONS

Seiji et al, "JP 2009 272269 MAchine translation", Nov. 19, 2011 Espacenet, pp. 1-8.*

(Continued)

*Primary Examiner* — Ryan Jarrett
*Assistant Examiner* — Olvin Lopez Alvarez
(74) *Attorney, Agent, or Firm* — Staas & Halsey LLP (57) ABSTRACT

A demand response (DR) system includes a DR control unit to generate different DR levels having different power rates for each power unit, and transmit a current DR level, and a household appliance to receive the DR level from the DR control unit, and differentially control energy output of a product in response to the received DR level so as to reduce power consumption of the product. As a result, the DR system reduces power consumption when power rates are high so as to reduce electricity bills.

7 Claims, 11 Drawing Sheets

(56) References Cited

U.S. PATENT DOCUMENTS

| | | | |
|---|---|---|---|
| 7,349,765 B2 | 3/2008 | Reaume et al. | |
| 7,528,503 B2 | 5/2009 | Rognli et al. | |
| 7,561,977 B2 | 7/2009 | Horst et al. | |
| 7,693,610 B2* | 4/2010 | Ying | 700/295 |
| 7,947,924 B2* | 5/2011 | Niiyama et al. | 219/209 |
| 8,005,576 B2* | 8/2011 | Rodgers | 700/295 |
| 8,190,302 B2* | 5/2012 | Burt et al. | 700/295 |
| 8,386,087 B2* | 2/2013 | Spicer et al. | 700/291 |
| 8,442,694 B2* | 5/2013 | Jang | 700/276 |
| 8,593,292 B2* | 11/2013 | Tsujimura | 340/657 |
| 2002/0024332 A1 | 2/2002 | Gardner | |
| 2003/0177776 A1 | 9/2003 | Ghent et al. | |
| 2003/0233201 A1* | 12/2003 | Horst et al. | 702/62 |
| 2004/0083112 A1* | 4/2004 | Horst | 705/1 |
| 2004/0117330 A1* | 6/2004 | Ehlers et al. | 705/412 |
| 2004/0139038 A1* | 7/2004 | Ehlers et al. | 705/412 |
| 2004/0220869 A1* | 11/2004 | Perera | 705/37 |
| 2008/0272934 A1* | 11/2008 | Wang et al. | 340/870.11 |
| 2009/0094173 A1* | 4/2009 | Smith et al. | 705/412 |
| 2009/0195349 A1* | 8/2009 | Frader-Thompson et al. | 340/3.1 |
| 2009/0198384 A1* | 8/2009 | Ahn | 700/292 |
| 2009/0234511 A1 | 9/2009 | Ouchi et al. | |
| 2009/0240381 A1* | 9/2009 | Lane | 700/296 |
| 2010/0089909 A1* | 4/2010 | Besore et al. | 219/720 |
| 2010/0092625 A1* | 4/2010 | Finch et al. | 426/231 |
| 2010/0121499 A1* | 5/2010 | Besore et al. | 700/295 |
| 2010/0121788 A1* | 5/2010 | Vaidyanathan et al. | 705/412 |
| 2010/0167659 A1* | 7/2010 | Wagner | 455/67.11 |
| 2010/0187219 A1* | 7/2010 | Besore et al. | 219/494 |
| 2010/0302064 A1* | 12/2010 | Rodgers | 340/870.16 |
| 2011/0016200 A1* | 1/2011 | Koch | 709/220 |
| 2011/0046806 A1* | 2/2011 | Nagel et al. | 700/291 |
| 2011/0078092 A1* | 3/2011 | Kim et al. | 705/412 |
| 2011/0125337 A1* | 5/2011 | Zavadsky et al. | 700/291 |
| 2011/0153101 A1* | 6/2011 | Thomas et al. | 700/291 |
| 2011/0153110 A1* | 6/2011 | Drake et al. | 700/296 |
| 2011/0196547 A1* | 8/2011 | Park et al. | 700/296 |
| 2011/0208369 A1* | 8/2011 | Yang et al. | 700/296 |
| 2011/0251431 A1* | 10/2011 | Hizaler Hoffmann et al. | 564/451 |
| 2011/0279353 A1* | 11/2011 | Son et al. | 345/2.3 |
| 2011/0290781 A1* | 12/2011 | Burt et al. | 219/396 |
| 2012/0022711 A1* | 1/2012 | Sakaguchi et al. | 700/295 |
| 2012/0089665 A1* | 4/2012 | Chung | 709/203 |
| 2012/0101651 A1* | 4/2012 | Haynes | 700/295 |
| 2012/0101652 A1* | 4/2012 | Shin et al. | 700/296 |
| 2012/0136499 A1* | 5/2012 | Jang et al. | 700/297 |
| 2012/0209443 A1* | 8/2012 | Lee et al. | 700/295 |
| 2012/0316695 A1* | 12/2012 | Chen et al. | 700/296 |
| 2013/0131880 A1* | 5/2013 | Lee | 700/291 |
| 2013/0325692 A1* | 12/2013 | Chassin et al. | 705/37 |

FOREIGN PATENT DOCUMENTS

| | | |
|---|---|---|
| EP | 1 263 108 A1 | 12/2002 |
| EP | 2 061 131 A1 | 5/2009 |
| JP | 2003-88004 | 3/2003 |
| JP | 2004-170310 | 6/2004 |
| JP | 2005-285112 | 10/2005 |
| JP | 2006-148450 | 6/2006 |
| JP | 2009-178362 | 8/2009 |
| JP | 2009-272269 | 11/2009 |
| WO | 95/29572 | 11/1995 |
| WO | 03/034789 A2 | 4/2003 |

OTHER PUBLICATIONS

European Search Report dated Aug. 19, 2011 in corresponding European Patent Application 11156116.3.
Chinese Office Action dated Mar. 5, 2014 from Chinese Patent Application No. 201110057677.5, 8 pages.

* cited by examiner

| POWER LEVEL | DR LEVEL | | | |
|---|---|---|---|---|
| INITIAL OUTPUT LEVEL (PL) | LEVEL 1 (Low) | LEVEL 2 (Medium) | LEVEL 3 (High) | LEVEL 4 (Critical) |
| 1 | 1 | 1 | 1 | 1 |
| 2 | 2 | 1 | 1 | 1 |
| 3 | 3 | 2 | 1 | 1 |
| 4 | 4 | 3 | 2 | 1 |
| 5 | 5 | 4 | 3 | 2 |
| 6 | 6 | 5 | 4 | 3 |
| 7 | 7 | 6 | 5 | 4 |
| 8 | 8 | 7 | 6 | 5 |
| 9 | 9 | 8 | 7 | 6 |

| TEMPERATURE LEVEL | DR LEVEL | | | |
|---|---|---|---|---|
| INITIAL SET TEMPERATURE (TL) | LEVEL 1 (Low) | LEVEL 2 (Medium) | LEVEL 3 (High) | LEVEL 4 (Critical) |
| 28°C | 28°C | 28°C | 28°C | 28°C |
| 27°C | 27°C | 28°C | 28°C | 28°C |
| 26°C | 26°C | 27°C | 28°C | 28°C |
| 25°C | 25°C | 26°C | 27°C | 28°C |
| 24°C | 24°C | 25°C | 26°C | 27°C |
| 23°C | 23°C | 24°C | 25°C | 26°C |
| 22°C | 22°C | 23°C | 24°C | 25°C |
| 21°C | 21°C | 22°C | 23°C | 24°C |
| 20°C | 20°C | 21°C | 22°C | 23°C |
| 19°C | 19°C | 20°C | 21°C | 22°C |
| 18°C | 18°C | 19°C | 20°C | 21°C |

DEMAND RESPONSE SYSTEM

CROSS-REFERENCE TO RELATED APPLICATIONS

This application claims the benefit of Korean Patent Application No. 2010-0018627, filed on Mar. 2, 2010 in the Korean Intellectual Property Office, the disclosure of which is incorporated herein by reference.

BACKGROUND

1. Field

Embodiments relate to a demand response system for reducing power consumption during peak power rates so as to reduce electricity bills.

2. Description of the Related Art

Generally, it is necessary for a power system to balance demand and supply. This requirement of the power system is of importance to rational utilization of limited energy resources.

For the aforementioned reasons, demand management is a focus of attention, and a number of studies are underway into demand response (DR) systems for advanced demand management.

Demand response (DR) can be defined as variation in consumption format depending on variation in power rates. In addition, demand response (DR) may be defined as incentive payment to restrict electricity consumption when power rates are high.

Demand response (DR) may further include a procedure for changing consumption behavior in the same manner as in the aforementioned incentive payment. By means of the aforementioned two methods, the demand response (DR) of consumers may be derived. Consumers can reduce power consumption during a specific time interval of high power rates even if such reduction in power consumption during the specific interval causes inconvenience. For example, the consumer may temporarily stop an air-conditioner in midsummer so as to reduce power consumption when power rates are high.

However, a conventional DR system has proposed an easy and simple control scheme dependent upon cost or price information. That is, the conventional DR system has been designed to limit the operation of household appliances in response to power rates, which may cause user inconvenience.

SUMMARY

Therefore, it is an aspect to provide a demand response system to change energy output of a product in response to a demand response (DR) level having power rate information per power unit, thereby reducing peak power rates when power rates are high so as to reduce electricity bills.

Additional aspects will be set forth in part in the description which follows and, in part, will be apparent from the description, or may be learned by practice of the invention.

In accordance with one aspect, a demand response system includes a demand response (DR) control unit to generate different DR levels having different power rates for each power unit, and transmit a current DR level; and a household appliance to receive the DR level from the DR control unit, and differentially control energy output of a product in response to the received DR level so as to reduce power consumption of the product.

The household appliance may include a storage unit to store information associated with the energy output for each DR level of the household appliance, a receiving unit to receive a DR level from the DR control unit, a controller to change the energy output of the household appliance to an output value corresponding to the received DR level according to the DR level received through the receiving unit so as to reduce power consumption of the household appliance, and a load driving unit to drive a variety of loads of the household appliance in response to a control signal of the controller.

The controller may reduce energy output as the received DR level increases.

The household appliance may be an induction heating cooker including a working coil heating a container, and the controller may change an initial output level of the working coil to a level corresponding to the received DR level in response to the received DR level.

The household appliance may be an air-conditioner, and the controller may change an initial set temperature of the air-conditioner to a temperature value corresponding to the received DR level in response to the received DR level.

The household appliance may be a refrigerator, and the controller may change an initial freezing-chamber temperature of the refrigerator to a temperature value corresponding to the received DR level in response to the received DR level.

The household appliance may be a refrigerator, and the controller may change an initial compressor operation rate of the refrigerator to an operation rate corresponding to the received DR level in response to the received DR level.

The household appliance may include an input unit to receive a command from a user; and the controller may disable or enable energy output control in response to the DR level upon receiving the user command from the input unit.

The input unit may include a first button to establish a time zone and a second button to establish the DR level, and the controller may maintain a DR level entered through the second button during a time zone entered through the first button.

The input unit may include a first button to establish a time and a second button to establish the DR level, and the controller may maintain a DR level entered through the second button during a time entered through the first button.

The household appliance may include a display unit, and the controller may display a currently operating DR level on the display unit.

The controller may display information associated with power rates reduced by energy output control in response to the DR level on the display unit.

The DR control unit may receive power rate information, accumulate the received power rate information in units of a predetermined time, i.e., one day, one week, one month, one year, or the like, and establish the plurality of DR levels using the accumulated power rate information.

In accordance with another aspect, an induction heating cooking apparatus includes a load driving unit to drive a working coil heating a container, a receiving unit to receive a demand response (DR) level related to power rate information for each power unit, a storage unit to store output levels of individual DR levels, and a controller to confirm an output level corresponding to the DR level received through the receiving unit, change the output level established in the working coil to the confirmed output level, and control an operation of the load driving unit in such a manner that the working coil is operated at the changed output level.

Information stored in the storage unit may be stored in a manner that the output level is reduced in proportion to the increasing DR level.

In accordance with another aspect, an air-conditioner includes a load driving unit to drive a compressor, a receiving unit to receive a demand response (DR) level related to power rate information for each power unit; a storage unit to store temperature values of individual DR levels, and a controller to confirm a temperature value corresponding to the DR level received through the receiver, change a set temperature established in the air-conditioner to the confirmed temperature value, and control an operation of the load driving unit so that the set temperature value of the air-conditioner reaches the changed temperature value.

Information stored in the storage unit may be stored in a manner that the temperature value increases in proportion to the increasing DR level.

In accordance with another aspect, a refrigerator may include a load driving unit to drive a compressor, a receiving unit to receive a demand response (DR) level related to power rate information for each power unit, a storage unit to store freezing-chamber temperature values of individual DR levels, and a controller to confirm a freezing-chamber temperature value corresponding to the DR level received through the receiver, change a set freezing-chamber temperature established in the refrigerator to the confirmed freezing-chamber temperature value, and control an operation of the load driving unit so that the freezing-chamber temperature value of the refrigerator reaches the changed freezing-chamber temperature value.

Information stored in the storage unit may be stored in a manner that the freezing-chamber temperature value increases in proportion to the increasing DR level.

In accordance with another aspect, a refrigerator includes a load driving unit to drive a compressor, a receiving unit to receive a demand response (DR) level related to power rate information for each power unit, a storage unit to store compressor operation rates of individual DR levels, and a controller to confirm a compressor operation rate corresponding to the DR level received through the receiver, change a compressor operation rate established in the refrigerator to the confirmed compressor operation rate, and control an operation of the load driving unit so that the refrigerator is operated at the changed compressor operation rate.

Information stored in the storage unit may be stored in a manner that the compressor operate rate is reduced in proportion to the increasing DR level.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
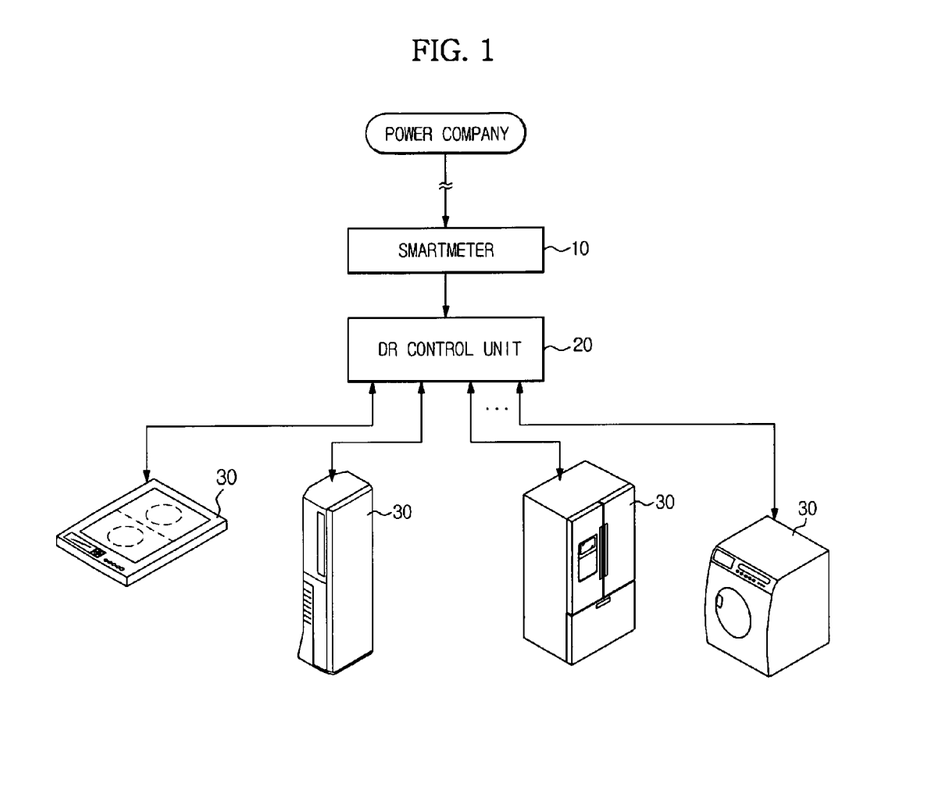
FIG. 1 is a configuration diagram illustrating a demand response (DR) system according to an embodiment.

FIG. 1 is a configuration diagram illustrating a demand response (DR) system according to an embodiment.

Referring to FIG. 1, the DR system includes a smartmeter 10 installed in a home to transmit and receive information to and from a power company; a DR control unit 20 for receiving information about electric charges from the smartmeter 10; and respective household appliances 30 connected to the DR control unit 20 over a network.

Each household appliance 30 performs a desired function using power received through a power line.

The household appliance 30 may include all kinds of electric household appliances, for example, an induction heating cooker, an air-conditioner, a refrigerator, a washing machine, etc.

The DR control unit 20 receives power rate information from the power company through the smartmeter 10, and establishes different DR levels of individual power units using the received power rate information. The established DR level information is transmitted to each household appliance 30.

The DR control unit 20 records power rate information received from the smartmeter 10 at intervals of a unit time. For example, assuming that the unit time is set to one hour, the power rate information is recorded 24 times each day. The DR control unit 20 establishes a plurality of DR levels representing different power rates of individual power units on the basis of the highest power rate and the lowest power rate using the power rate information. In this case, each DR level may be represented by power rates for every power unit.

Using the power rate information, the DR level can be more accurately obtained by an average of power rate information accumulated in units of a predetermined time, for example, one day, one week, one month, one year, etc.

Figure 2:
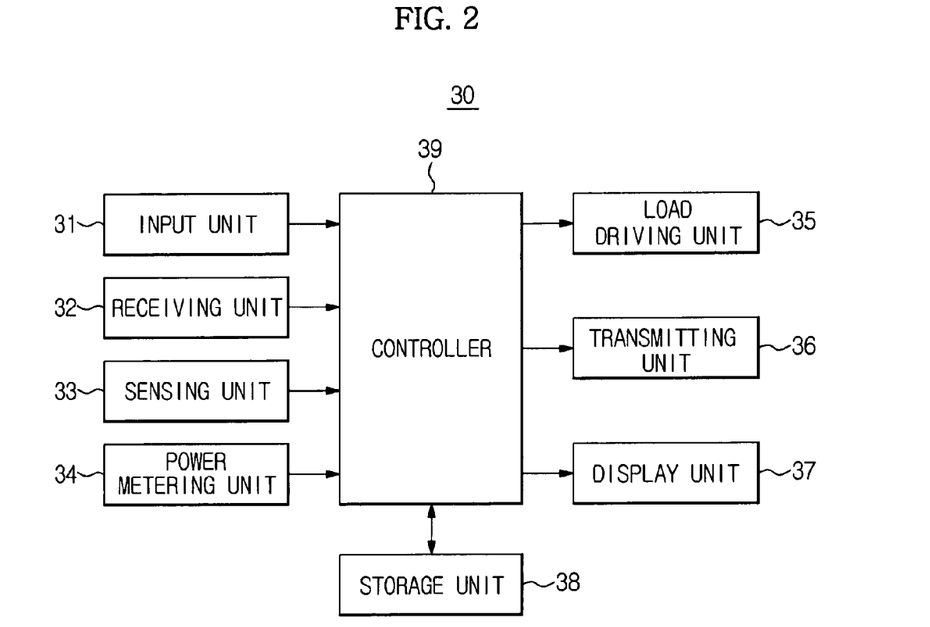
FIG. 2 is a control block diagram illustrating a household appliance for use in a DR system according to an embodiment.

FIG. 2 is a control block diagram illustrating a household appliance for use in a DR system according to an embodiment.

Referring to FIG. 2, the household appliance 30 includes an input unit 31, a receiving unit 32, a sensing unit 33, a power metering unit 34, a load driving unit 35, a transmitting unit 36, a display unit 37, a storage unit 38, and a controller 39.

The input unit 31, for example, a keypad, a keyboard, a joystick, a touchpad, a button, etc., is used as an interface unit allowing a user to enter a desired command. Specifically, the input unit 31 may be integrated with the display unit 37, and may be configured in the form of a touchscreen.

The receiving unit 32 receives DR level information from the DR control unit 20.

The sensing unit 33 detects various states of a household appliance. If the household appliance is an induction heating cooker, the sensing unit 33 includes a variety of sensors for sensing various states of the induction heating cooker, for example, a temperature sensor, a voltage sensor, etc. If the household appliance is an air-conditioner, the sensing unit 33 includes a variety of sensors for sensing various states of the air-conditioner, for example, an indoor temperature sensor, an outdoor temperature sensor, an evaporator temperature sensor, etc. If the household appliance is a refrigerator, the sensing unit 33 includes a variety of sensors, for example, an in-chamber temperature sensor, an evaporator temperature sensor, a discharge temperature sensor, etc.

The power metering unit 34 measures an amount of power consumed in a household appliance at intervals of a predetermined time, i.e., one day, one week, one month, one year, or the like.

The load driving unit 35 drives a variety of loads of the household appliance.

The transmitting unit 36 transmits a variety of information of the household appliance to the DR control unit 20. For example, the transmitting unit 36 transmits an amount of household-appliance power consumption measured by the power metering unit 34 to the DR control unit 20.

The display unit 37 displays an operation status of the household appliance 20, and displays messages associated with both the DR level operation and the power saving.

The storage unit 38 stores not only information related to an initial output level for each household appliance but also information related to a changed value of an initial output level for each DR level.

The controller 39 controls individual elements constructing each household appliance.

The controller 39 changes an initial output value established in a household appliance to another output value capable of reducing power consumption according to a DR level received from the DR control unit 20. In this case, the controller 39 reduces the initial output value in proportion to a current DR level, such that power consumption is reduced as the current DR level increases.

In this case, if the household appliance is an induction heating cooker, the controller 39 changes an initial output level value established in a working coil for heating a container of the induction heating cooker to another output level value capable of reducing power consumption according to the DR level received from the DR control unit 20. In this case, the controller 39 reduces the initial output value in proportion to a current DR level, such that power consumption is reduced as the current DR level increases.

In addition, if the household appliance is an air-conditioner, the controller 39 changes an initial set temperature value established in the air-conditioner to another output set temperature value capable of reducing power consumption according to the DR level received from the DR control unit 20. In this case, the controller 39 increases the initial set temperature value in proportion to a current DR level, such that power consumption is reduced as the current DR level increases.

Further, if the household appliance is a refrigerator, the controller 39 changes an initial freezing temperature value established in the refrigerator to another freezing temperature value capable of reducing power consumption according to a DR level received from the DR control unit 20. In this case, the controller 39 increases the initial freezing temperature value in proportion to a current DR level, such that power consumption is reduced as the current DR level increases. In this case, the initial refrigerating temperature value may be used instead of the initial freezing temperature value.

In addition, the controller 39 establishes an associated command in such a manner that an initial output in response to a DR level can be manually changed in response to a user command without being automatically changed. That is, the controller 39 confirms a user command when an initial output is changed in response to a DR level, such that the initial output may be immediately changed or be changed from a reserved time or an output value to be changed may be changed to a user-input output value.

In addition, the controller 39 displays current DR level information so as to allow the user to recognize a current DR level. Also, the controller 39 is operated at a current DR level so as to allow the user to recognize the power saving effect obtained by the DR level operation, such that it can display information indicating how much power rates are reduced as compared to another case in which the controller 39 is not operated at the DR level.

Detailed operations of the controller 39 for each household appliance will hereinafter be described in detail.

Hereinafter, operations of the controller 39 on the assumption that the household appliance is an induction heating cooker will be given below.

Figure 3:
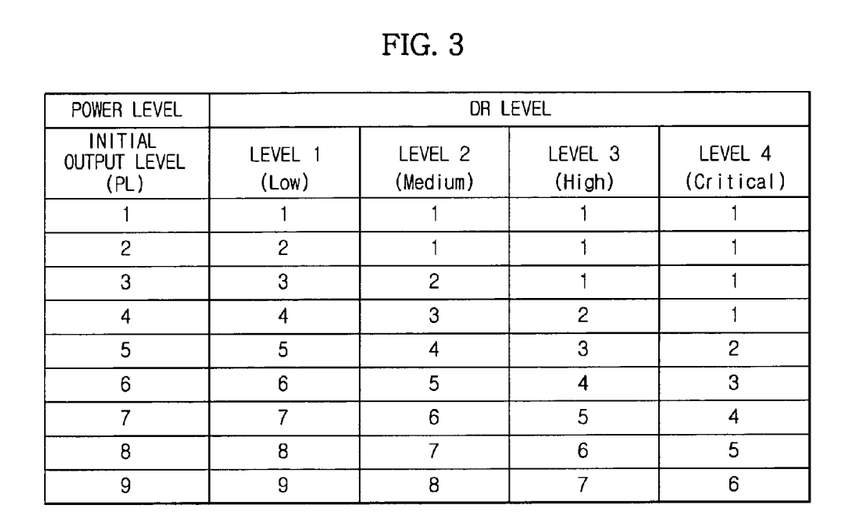
FIG. 3 is a table illustrating initial output levels in response to DR levels of an induction heating cooker of a DR system according to an embodiment.
Figure 4:
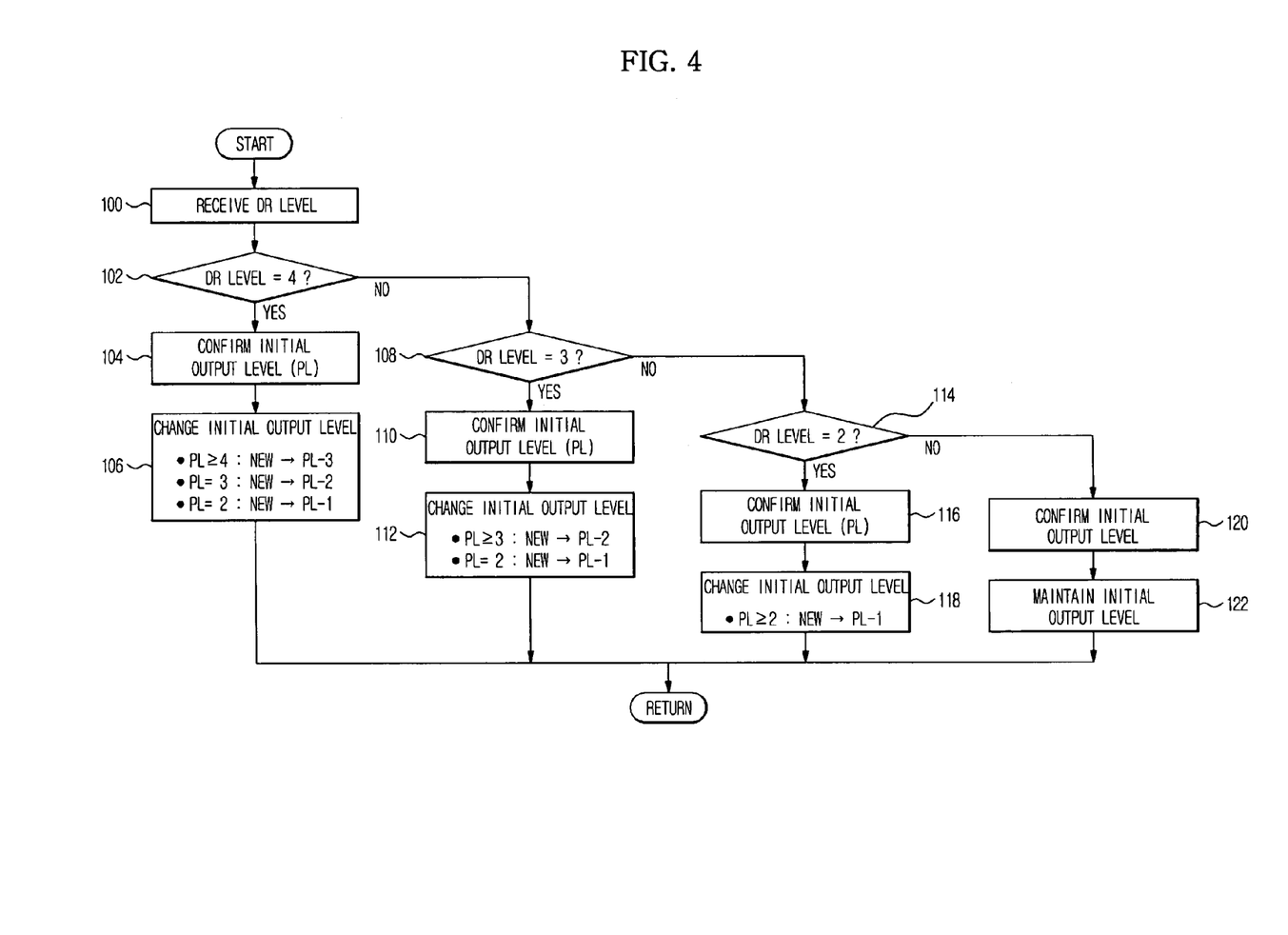
FIG. 4 is a flowchart illustrating a method for controlling an induction heating cooker using a DR system according to an embodiment.

FIG. 3 is a table illustrating initial output levels in response to DR levels of an induction heating cooker of a DR system according to an embodiment. FIG. 4 is a flowchart illustrating a method for controlling an induction heating cooker using a DR system according to an embodiment.

Referring to FIGS. 3 and 4, the controller 39 receives a DR level from the DR control unit 20 through the receiving unit 32 at operation 100.

After receiving the DR level from the DR control unit 20, the controller 39 determines whether the received DR level is a fourth DR level at operation 102.

If the received DR level is the fourth DR level at operation 102, the controller 39 confirms the initial output level of the working coil installed in the induction heating cooker at operation 104.

After confirming the initial output level of the working coil, the controller 39 changes the initial output level to another output level corresponding to the fourth DR level, which is less than the initial output level, at operation 106.

For example, as shown in FIG. 3, if the confirmed initial output level is equal to or higher than the fourth DR level (i.e., PL≥4), the controller 39 changes a new output level (NEW) to a value of (PL−3) indicating that a third DR level is deducted from the initial output level. If the confirmed initial output level is a third level (PL=3), the controller 39 changes a new output level (NEW) to a value of (PL−2) indicating that a second DR level is deducted from the initial output level. In addition, if the confirmed initial output level is a second DR level (PL=2), the controller 39 changes a new output level (NEW) to a value of (PL−1) indicating that a first level is deducted from the initial output level.

Meanwhile, if the received DR level is not identical to the fourth DR level at operation 102, the controller 39 determines whether the received DR level is a third DR level at operation 108.

If the received DR level is not identical to the third DR level at operation 108, the controller 39 confirms an initial output level of the working coil installed in the induction heating cooker at operation 110.

After confirming the initial output level of the working coil the controller 39 changes the initial output level to another output level corresponding to a third DR level, which is less than the initial output level, at operation 112.

For example, as shown in FIG. 3, if the confirmed initial output level is equal to or higher than the third DR level (i.e., PL≥3), the controller 39 changes a new output level (NEW) to a value of (PL−2) indicating that a second DR level is deducted from the initial output level. If the confirmed initial output level is a second level (PL=2), the controller 39 changes a new output level (NEW) to a value of (PL−1) indicating that a first DR level is deducted from the initial output level.

Meanwhile, if the received DR level is not identical to the third DR level at operation 108, the controller 39 determines whether the received DR level is a second DR level at operation 114.

If the received DR level is identical to the second DR level at operation 114, the controller 39 confirms an initial output level of the working coil installed in the induction heating cooker at operation 116.

After confirming the initial output level of the working coil the controller 39 changes the initial output level to another output level corresponding to a second DR level, which is less than the initial output level, at operation 118.

For example, as shown in FIG. 3, if the confirmed initial output level is equal to or higher than the second DR level (PL≥2), the new output level (NEW) is changed to a value of (PL−1) indicating that a first DR level is deducted from the initial output level.

Meanwhile, if the received DR level is not identical to the second DR level at operation 114, the controller 39 determines that the received DR level is the first DR level, and confirms an initial output level of the working coil installed in the induction heating cooker at operation 120.

After confirming the initial output level, the controller 39 maintains the initial output level at operation 122.

As described above, the controller 39 changes the initial output level to an output level corresponding to a DR level. The output level is determined according to a duty ratio of a PWM (Pulse Width Modulation) signal provided to the working coil. As the DR level is changed from the first DR level to the fourth DR level, the controller 39 gradually reduces the duty ratio. As a result, power consumption of the working coil is reduced so that the peak demand is also reduced.

When receiving a new DR level at the same level during a predetermined time (e.g., 5 seconds), the controller 39 recognizes the received DR level as a valid or effective value.

An override function indicates that an initial output level is maintained without changing the initial output level, irrespective of the received DR level. The controller 39 maintains the initial output level irrespective of a DR level when a user enters this override function.

The relationship between the DR level and the initial output level is shown in FIG. 3. For example, provided that the user sets an initial output level to '4', if the DR level is set to 1, level 4 is maintained without change. However, if the DR level of 2 is used, the initial output level is changed from 4 to 3. In addition, if the DR level of 3 is used, the initial output level is changed from 4 to 2. If the DR level of 4 is used, the initial output level is changed from 4 to 1.

As described above, the higher the DR level, the lower the initial output level. As a result, the DR system according to the embodiments can reduce power consumption during the high-DR-level interval, resulting in reduction in electricity bills.

Operations of the DR system when the household appliance is an air-conditioner will hereinafter be described in detail.

Figure 5:
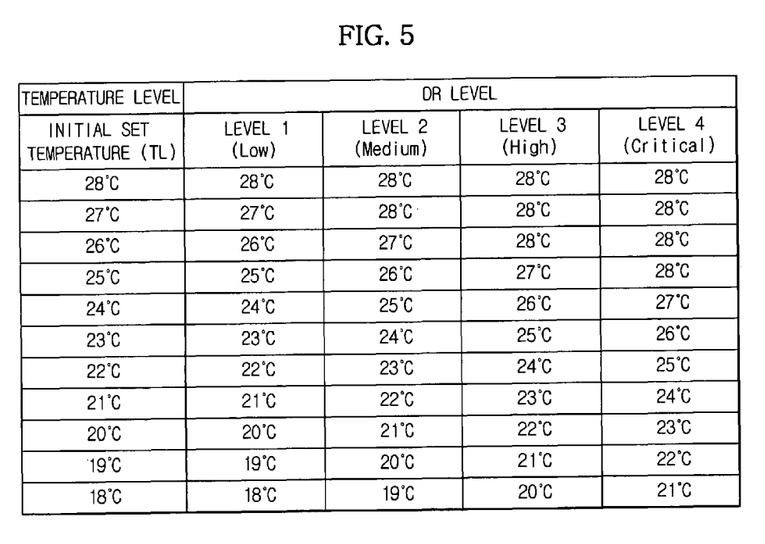
FIG. 5 is a table illustrating temperature levels in response to DR levels of an air-conditioner for use in a DR system according to an embodiment.
Figure 6:
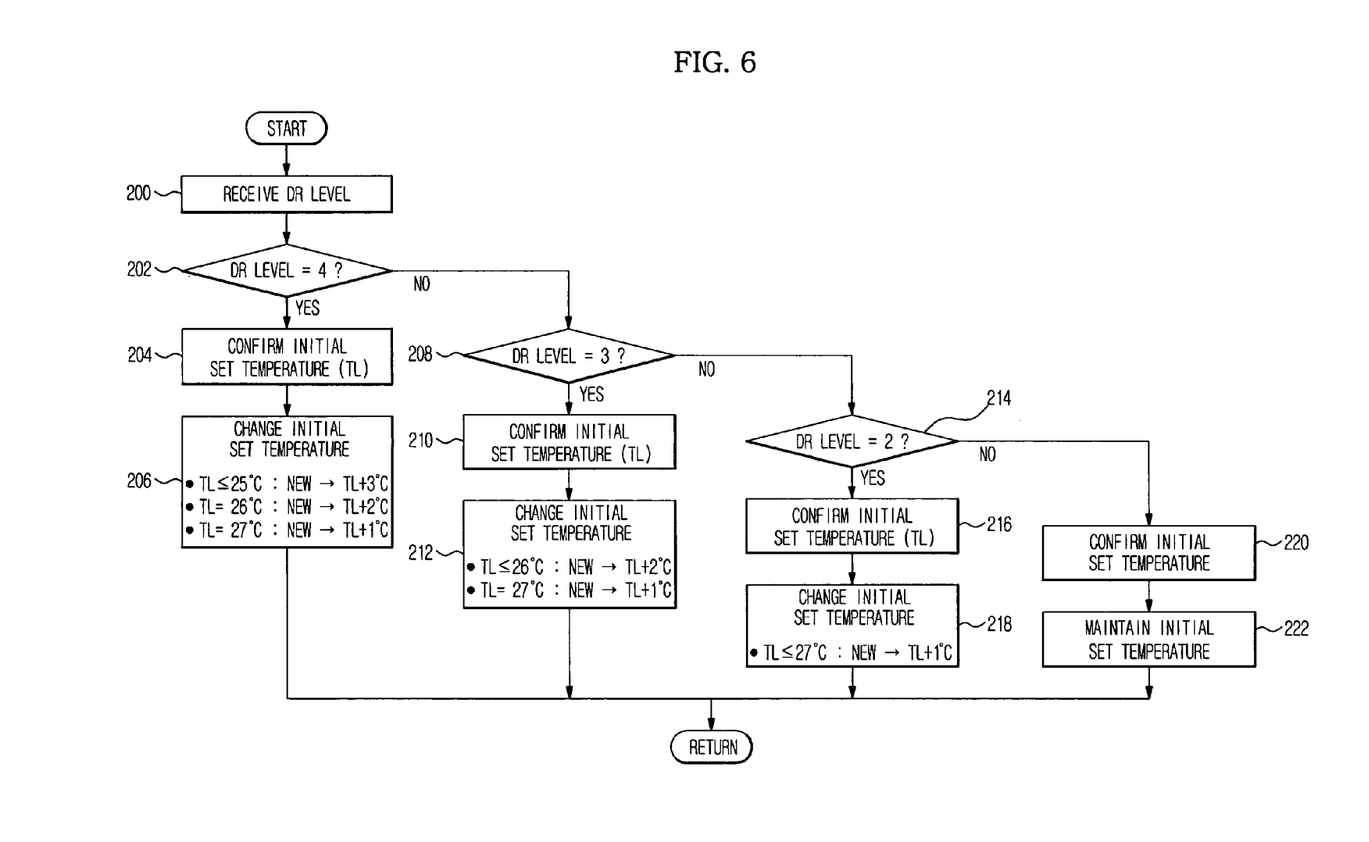
FIG. 6 is a flowchart illustrating a method for controlling an air-conditioner using a DR system according to an embodiment.

FIG. 5 is a table illustrating temperature levels in response to DR levels of an air-conditioner for use in a DR system according to an embodiment. FIG. 6 is a flowchart illustrating a method for controlling an air-conditioner using a DR system according to an embodiment.

Referring to FIGS. 5 and 6, the controller 39 receives a DR level from the DR control unit 20 through the receiving unit 32 at operation 200.

After receiving the DR level from the DR control unit 20, the controller 39 determines whether the received DR level is a fourth DR level at operation 202.

If the received DR level is the fourth DR level at operation 202, the controller 39 confirms the initial set temperature of the air-conditioner at operation 204.

After confirming the initial set temperature of the air-conditioner, the controller 39 changes the initial set temperature to another set temperature corresponding to the fourth DR level less than the initial set temperature at operation 206.

For example, as shown in FIG. 5, if the confirmed initial set temperature is equal to or higher than 25° C. (i.e., TL≤25° C.), the controller 39 changes a new set temperature (NEW) to a temperature value of (TL+3° C.) indicating that a temperature of 3° C. is added to the initial set temperature. If the confirmed initial set temperature is a temperature of 26° C. (i.e., TL=26° C.), the controller 39 changes a new set temperature (NEW) to a temperature value of (TL+2° C.) indicating that 2° C. is added to the initial set temperature. In addition, if the confirmed initial set temperature is a temperature of 27° C. (i.e., TL=27° C.), the controller 39 changes a new set temperature (NEW) to a temperature value of (TL+1° C.) indicating that 1° C. is added to the initial set temperature.

Meanwhile, if the received DR level is not identical to the fourth DR level at operation 202, the controller 39 determines whether the received DR level is a third DR level at operation 208.

If the received DR level is identical to the third DR level at operation 208, the controller 39 confirms an initial set temperature of the air-conditioner at operation 210.

After confirming the initial set temperature of the air-conditioner, the controller 39 changes the initial set temperature to another set temperature corresponding to a third DR level less than the initial set temperature at operation 212.

For example, as shown in FIG. 5, if the confirmed initial set temperature is equal to or higher than 26° C. (i.e., TL≤26° C.), the controller 39 changes a new set temperature (NEW) to a temperature value of (TL+2° C.) indicating that 2° C. is added to the initial set temperature. If the confirmed initial set temperature is 27° C. (i.e., TL=27° C.), the controller 39 changes a new set temperature (NEW) to a temperature value of (TL+1° C.) indicating that 1° C. is added to the initial set temperature.

Meanwhile, if the received DR level is not identical to the third DR level at operation 208, the controller 39 determines whether the received DR level is a second DR level at operation 214.

If the received DR level is identical to the second DR level at operation 214, the controller 39 confirms an initial set temperature of the air-conditioner at operation 216.

After confirming the initial set temperature of the air-conditioner, the controller 39 changes the initial set temperature to another set temperature corresponding to a second DR level less than the initial set temperature at operation 218.

For example, as shown in FIG. 5, if the confirmed initial set temperature is equal to or higher than 27° C. (i.e., TL≤27° C.), the controller 39 changes a new set temperature (NEW) to a temperature value of (TL+1° C.) indicating that 1° C. is added to the initial set temperature.

Meanwhile, if the received DR level is not identical to the second DR level at operation 214, the controller 39 determines that the received DR level is a first DR level, such that it confirms the initial set temperature of the air-conditioner at operation 220.

After confirming the initial set temperature of the air-conditioner, the controller 39 maintains this initial setup temperature at operation 222.

As described above, the DR level is sub-divided into several steps, such that power consumption corresponding to each level is controlled. If a compressor is operated at a user-desired temperature, power consumption is maximized. If the DR level is increased, a user-desired temperature is gradually increased to reduce the operation time of the air-conditioner, resulting in reduced power consumption and reduced peak load.

When the new DR level is received at the same level during a predetermined time, the DR level is changed. Upon receiving a new level during the predetermined time, the DR level is maintained at a previous level.

In the same manner as in the induction heating cooker, the air-conditioner has an override function for maintaining the initial set temperature. If the user enters the override function, the controller 39 continuously maintains the initial set temperature irrespective of a DR level.

The controller 39 can display the corresponding DR level on the display unit 37 when a DR level is changed, and can display the reduced power rates caused by the corresponding DR level operation.

If the user does not want to control the operation of the air-conditioner in response to the DR level, the controller 39 may release the operation control of the air-conditioner in response to the DR level upon receiving a command from the user.

The relationship between the DR level and the initial set temperature is shown in FIG. 5. For example, in an ordinary case, the user sets an initial set temperature to 18° C. If the DR level is changed during the operation of the air-conditioner, the initial set temperature is compulsorily increased by +2° C. Thereafter, if the DR level of 1 is used, the initial user setup information is maintained. However, as the DR level is increased, the initial set temperature is increased in increments of +2° C.

Instead of changing the initial set temperature, the DR system according to the present invention compulsorily adjusts the compressor operation rate in proportion to the increasing DR level, resulting in reduction of power consumption. That is, the DR system gradually reduces the air-conditioner operation time in proportion to the increasing DR level. For example, if the DR level of 1 is used, the compressor operation of the air-conditioner is 50-minutes operation mode→10-minutes stop mode. If the DR level of 2 is used, the compressor operation of the air-conditioner is 40-minutes operation mode→20-minutes stop mode. If the DR level of 3 is used, the compressor operation of the air-conditioner is 30-minutes operation mode→30-minutes stop mode. If the DR level of 4 is used, the compressor operation of the air-conditioner is 20-minutes operation mode→40-minutes stop mode.

Through the above-mentioned scheme, the higher the DR level, the lower the initial set temperature. Alternatively, the higher the DR level, the lower the compressor operation rate. As a result, power consumption can be reduced during a high-DR-level interval, resulting in reduction of power rates.

Operations of the DR system when the household appliance is a refrigerator will hereinafter be described in detail.

Figure 7:
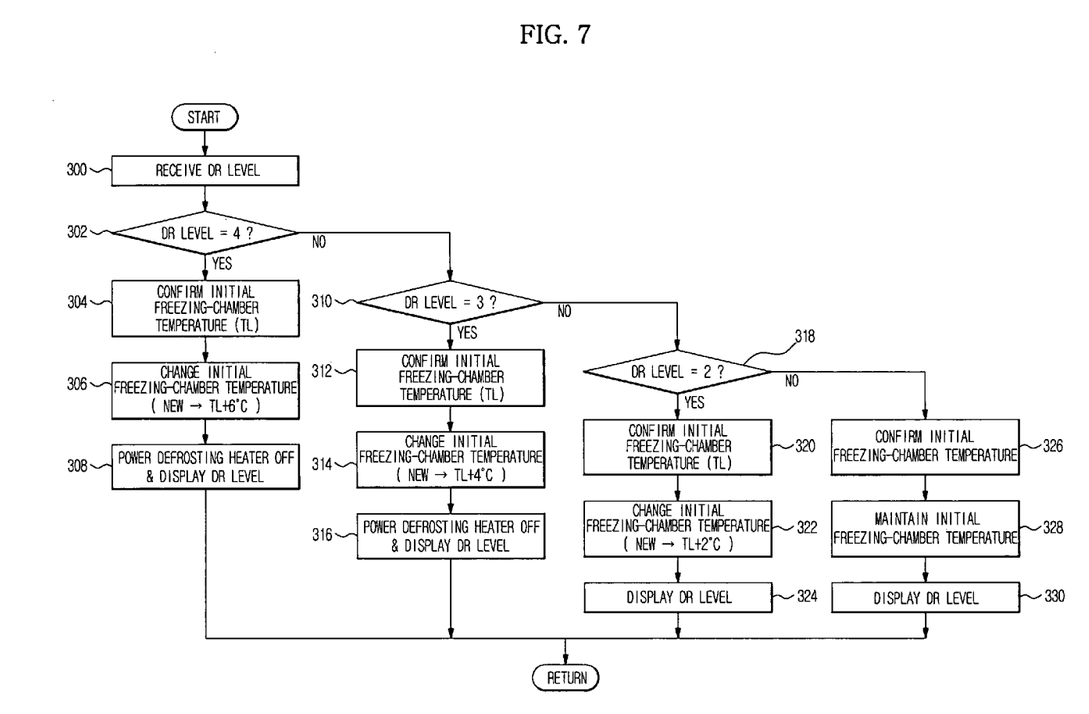
FIG. 7 is a flowchart illustrating a method for controlling a refrigerator using a DR system according to an embodiment.

FIG. 7 is a flowchart illustrating a method for controlling a refrigerator using a DR system according to an embodiment.

Referring to FIG. 7, the controller 39 receives a DR level from the DR control unit 20 through the receiving unit 32 at operation 300.

After receiving the DR level from the DR control unit 20, the controller 39 determines whether the received DR level is a fourth DR level at operation 302.

If the received DR level is the fourth DR level at operation 302, the controller 39 confirms the initial freezing-chamber temperature of the refrigerator at operation 304.

After confirming the initial freezing-chamber temperature of the refrigerator, the controller 39 changes the initial freezing-chamber temperature to a freezing-chamber temperature corresponding to the fourth DR level, which is less than the initial freezing-chamber temperature at operation 306.

For example, the controller 39 changes a new freezing-chamber temperature (NEW) to a temperature of (TL+6° C.) indicating that 6° C. is added to the initial freezing-chamber temperature.

In addition, the controller 39 powers off a defrosting heater to defrost an evaporator, and at the same time displays a current DR level (fourth DR level) at operation 308.

Meanwhile, if the received DR level is not identical to the fourth DR level at operation 302, the controller 39 determines whether the received DR level is a third DR level at operation 310.

If the received DR level is identical to the third DR level at operation 310, the controller 39 confirms an initial freezing-chamber temperature of the refrigerator at operation 312.

After confirming the initial freezing-chamber temperature of the refrigerator, the controller 39 changes the initial freezing-chamber temperature to another freezing-chamber temperature corresponding to the third DR level, which is less than the initial freezing-chamber temperature at operation 314.

For example, the controller 39 changes a new freezing-chamber set temperature (NEW) to a temperature value of (TL+4° C.) indicating that 4° C. is added to the initial freezing-chamber temperature.

The defrosting heater is powered off and at the same time the current DR level (third DR level) is displayed at operation 316.

Meanwhile, if the received DR level is not identical to the third DR level at operation 310, the controller 39 determines whether the received DR level is identical to the second DR level at operation 318.

If the received DR level is identical to the second DR level at operation 318, the controller 39 confirms the initial freezing-chamber temperature of the refrigerator at operation 320.

After confirming the initial freezing-chamber temperature of the refrigerator, the controller 39 changes the initial freezing-chamber temperature to another freezing-chamber temperature corresponding to the second DR level indicating a low freezing-chamber temperature less than the initial freezing-chamber temperature at operation 322.

For example, the controller 39 changes a new freezing-chamber temperature (NEW) to a temperature of (TL+2° C.) indicating that 2° C. is added to the initial freezing-chamber temperature.

Meanwhile, if the received DR level is not identical to the second DR level at operation 318, the controller 39 determines that the received DR level is a first DR level and confirms the initial freezing-chamber temperature of the refrigerator at operation 326.

After confirming the initial freezing-chamber temperature of the refrigerator, the controller 39 maintains this initial freezing-chamber temperature at operation 328.

In addition, the current DR level (first DR level) is displayed at operation 330.

As described above, as the DR level is increased, the initial freezing-chamber temperature decided by the user is also gradually increased to reduce the compressor operation time of the refrigerator, such that power consumption is reduced and peak load is also reduced.

Upon receiving a new DR level at the same level during a predetermined time, the DR level is changed. Otherwise, upon receiving a different level instead of the same level during a predetermined time, the DR level is maintained at a previous level.

In the same manner as in the induction heating cooker and the air-conditioner, the refrigerator also has an override function capable of maintaining the initial freezing-chamber temperature irrespective of the DR level. If the user enters the override function, the controller 39 maintains the initial freezing-chamber temperature irrespective of the DR level.

If the DR level displayed on the display unit 37 is changed, the controller 39 displays the corresponding DR level on the display unit 37, and can display power consumption corresponding to the new DR level.

In addition, if the user does not want to control the operation of the refrigerator in response to the DR level, the controller 39 may release the operation control of the refrigerator in response to the DR level upon receiving a command from the user.

If the DR level of 2 is used, the controller 39 increases the initial freezing-chamber temperature by 2° C. For example, if the initial freezing-chamber temperature is set to −20° C., the initial freezing-chamber temperature is changed to −18° C., resulting in reduction in compressor operation time. In this case, the defrosting heater is normally operated.

If the DR level of 3 is used, the controller 39 increases the initial freezing-chamber temperature by 4° C. For example, if the initial freezing-chamber temperature is set to −20° C., the initial freezing-chamber temperature is changed to −16° C., resulting in reduction in compressor operation time. In this case, the defrosting heater is not operated.

In addition, if the DR level of 4 is used, the controller 39 increases the initial freezing-chamber temperature by 6° C. For example, if the initial freezing-chamber temperature is set to −20° C., the initial freezing-chamber temperature is changed to −14° C., resulting in reduction in compressor operation time. In this case, the defrosting heater is not operated.

Through the above-mentioned scheme, the higher the DR level, the higher the initial freezing-chamber temperature, such that the operation time of the compressor of the refrigerator is reduced. As a result, power consumption can be reduced during a high-DR-level interval, reducing power consumption.

Figure 8:
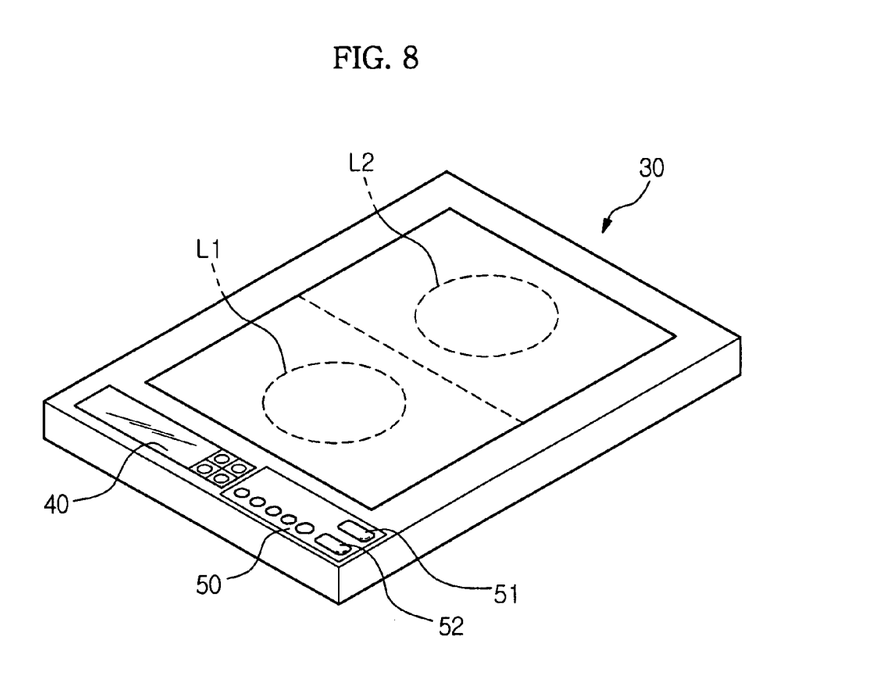
FIG. 8 shows an induction heating cooker for use in a DR system according to an embodiment.

FIG. 8 shows an induction heating cooker for use in a DR system according to an embodiment.

Referring to FIG. 8, the induction heating cooker 30 for use in the DR system according to the embodiment includes two heating coils L1 and L2 that are installed under a cooking board on which a container is put so as to provide heat to the cooking board.

In order to operate individual heating coils L1 and L2, one side of the main body of the induction heating cooker 30 includes not only a plurality of operation panels 50 for entering corresponding commands but also a display panel 40 for displaying information.

Therefore, the user puts the container on the cooking board, confirms the positions of the heating coils L1 and L2 used to heat the container through the display panel 40, and presses the operation panel 50 to enter initial output levels of individual heating coils L1 and L2, such that high-frequency power source is provided to the heating coils L1 and L2 on which the container is placed, thereby heating the container.

The operation panel 50 includes a first button 51 and a second button 52. The first button 51 is a 'Start Now' button, and the second button 52 is a 'Start on DR' button. The 'Start Now' button is adapted to establish an override function, and the 'Start on DR' button is adapted to release the function (i.e., override function) for automatically executing the energy output control in response to the DR level.

If the user operates the induction heating cooker when the DR level is high and power rates are high, this operation of the induction heating cooker is considered to be inefficient. Therefore, in this case, the user may immediately operate the induction heating cooker as needed, or may also optionally operate the induction heating cooker at the power saving mode as needed. For reference, these buttons can be applied to all household appliances, for example, induction heating cookers, air-conditioners, refrigerators, washing machines, etc.

Figure 9:
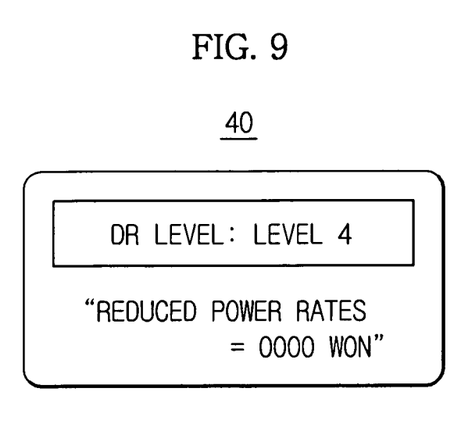
FIG. 9 shows a message indicating a DR level operation and a message indicating reduced power rates that are displayed on a display panel of an induction heating cooker for use in a DR system according to an embodiment.

FIG. 9 shows a message indicating a DR level operation and a message indicating reduced power rates that are displayed on a display panel of an induction heating cooker for use in a DR system according to an embodiment.

Referring to FIG. 9, the controller 39 displays the currently-operating DR level information so as to allow the user to recognize a current DR level through the display unit 37. In addition, the controller 39 is operated at a current DR level so as to allow the user to recognize the power saving effect obtained by the DR level operation, such that it can display information indicating how much power rates are reduced as compared to another case in which the controller 39 is not operated at the DR level.

Figure 10:
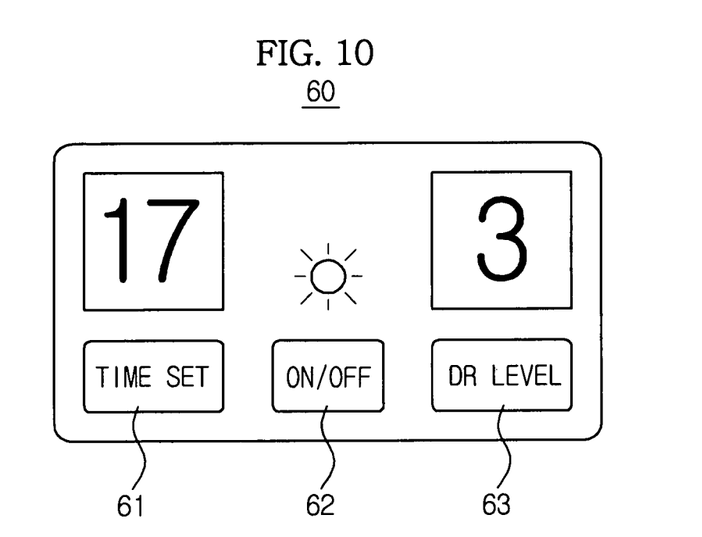
FIG. 10 shows an operation panel for manually establishing a DR level of a household appliance for use in a DR system according to an embodiment.
Figure 11:
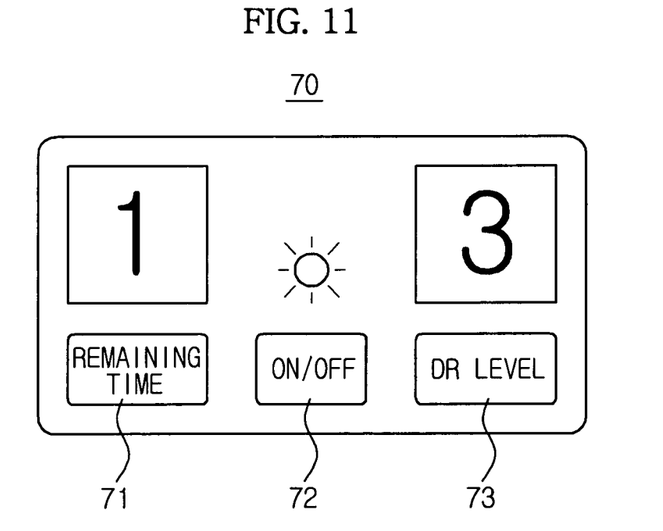
FIG. 11 shows another operation panel for manually establishing a DR level of a household appliance for use in a DR system according to an embodiment.

FIG. 10 shows an operation panel for manually establishing a DR level of a household appliance for use in a DR system according to an embodiment. FIG. 11 shows another operation panel for manually establishing a DR level of a household appliance for use in a DR system according to an embodiment.

The operation panels 60 and 70 through which the user can freely change a DR level or the like are mounted to the household appliance, such that the user can adjust the operation panels 60 and 70 as necessary.

For example, the user may enable or disable the energy output control in response to the DR level using the ON/OFF button 62 contained in the operation panel 60 or 70 having the DR level set button 63. In this case, the input DR level is maintained through the DR level set button 62 during the time zone entered using the time-zone set button 61.

In addition, if the user enters a desired time through the time set button 61 contained in the operation panel 70 and enters a DR level through the DR level set button 72, the DR level entered through the DR level set button 72 is maintained during the input time entered through the time set button 71. If the input time has elapsed after the expiration of a timer, the manual DR level control is ended and energy output may be controlled in response to the DR level received from the DR control unit 20.

Through the above-mentioned scheme, the common DR control shortcoming in which the household appliance is unable to perform its own performance of 100% can be eliminated, such that the DR level can be more reasonably controlled.

As is apparent from the above description, the DR system according to the embodiment changes an initial output level of a household appliance in response to different DR levels having different power rates per power unit, thereby reducing power consumption when power rates are high so as to reduce electricity bills.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An induction heating cooking apparatus comprising:
   a load driving unit to drive a working coil heating a container;
   a receiving unit to receive a demand response (DR) level related to power rate information;
   a storage unit to store output levels of individual DR levels; and
   a controller to confirm an output level corresponding to the DR level received through the receiving unit, change an output level established in the working coil to the confirmed output level, and control an operation of the load driving unit in such a manner that the working coil is operated at the changed output level,
   wherein the demand response level is established by a demand response (DR) control unit which receives power rate information from a power company to establish DR levels representing different power rates using the received power rate information,
   wherein the stored output levels in the storage unit are equal to initial output levels when the received DR level is a lowest possible DR level, and
   wherein the stored output levels in the storage unit are values which are decreased from the initial output levels by an amount corresponding to the difference between the received DR level and the lowest possible DR level to a minimum of a lowest possible initial output level, when the received DR level is not the lowest possible DR level.

2. The induction heating cooking apparatus according to claim 1, wherein information stored in the storage unit is stored so that the output level is reduced in proportion to the increasing DR level.

3. An air-conditioner comprising:
   a load driving unit to drive a compressor;
   a receiving unit to receive a demand response (DR) level related to power rate information;
   a storage unit to store temperature values of individual DR levels; and
   a controller to confirm a temperature value corresponding to the DR level received through the receiver, change a set temperature established in the air-conditioner to the confirmed temperature value, and control an operation of the load driving unit in a manner that the set temperature value of the air-conditioner reaches the changed temperature value,
   wherein the demand response level is established by a demand response (DR) control unit which receives power rate information from a power company to establish DR levels representing different power rates using the received power rate information,
   wherein the stored temperature values in the storage unit are equal to initial set temperature values if the received DR level is a lowest possible DR level, and
   wherein the stored temperature values in the storage unit are increased, by one degree times a number equal to the difference between the received DR level and the lowest possible DR level, up to a maximum value equal to a maximum value for the initial set temperature, when the received DR level is not the lowest possible DR level.

4. The air-conditioner according to claim 3, wherein information stored in the storage unit is stored so that the temperature value increases in proportion to the increasing DR level.

5. A refrigerator comprising:
   a load driving unit to drive a compressor;
   a receiving unit to receive a demand response (DR) level related to power rate information;
   a storage unit to store freezing-chamber temperature values of individual DR levels; and
   a controller to confirm a freezing-chamber temperature value corresponding to the DR level received through the receiver, change a set freezing-chamber temperature established in the refrigerator to the confirmed freezing-chamber temperature value, and control an operation of the load driving unit so that the freezing-chamber temperature value of the refrigerator reaches the changed freezing-chamber temperature value,
   wherein the demand response level is established by a demand response (DR) control unit which receives power rate information from a power company to establish DR levels representing different power rates using the received power rate information,
   wherein the stored freezing-chamber temperature values in the storage unit are equal to initial freezing-chamber temperature values when the received DR level is a lowest possible DR level,
   wherein the stored freezing-chamber temperature values in the storage unit are increased, by two degrees times a number equal to the difference between the received DR level and the lowest possible DR level, when the received DR level is not the lowest possible DR level, and
   wherein a power defrosting heater is deactivated if the received DR level is higher than one level higher than the lowest possible DR level.

6. The refrigerator according to claim 5, wherein information stored in the storage unit is stored so that the freezing-chamber temperature value increases in proportion to the increasing DR level.

7. A demand response system comprising:
   a demand response (DR) control unit to receive power rate information from a power company, to establish DR levels representing different power rates using the received power rate information, and to transmit a current DR level;
   a household appliance to receive the DR level from the DR control unit, and differentially control energy output of the household appliance in response to the received DR level and an energy output level set by a user so as to reduce power consumption of the household appliance;
   wherein the household appliance includes a load driving unit to drive a plurality of load levels of the household appliance in response to a control signal of the controller; and
   wherein the load level is decreased by an amount proportional to the difference between the current DR level and the lowest possible DR level such that the decrease load level is at least the minimum load level for the appliance.

* * * * *